US012263676B2

(12) United States Patent
Yamada et al.

(10) Patent No.: US 12,263,676 B2
(45) Date of Patent: Apr. 1, 2025

(54) PRINTING ELEMENT BOARD AND PRINTING APPARATUS INCLUDING PRINTING ELEMENT BOARD

(71) Applicant: CANON KABUSHIKI KAISHA, Tokyo (JP)

(72) Inventors: Ryohei Yamada, Kanagawa (JP); Toshio Negishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 91 days.

(21) Appl. No.: 18/124,169

(22) Filed: Mar. 21, 2023

(65) Prior Publication Data

US 2023/0302786 A1 Sep. 28, 2023

(30) Foreign Application Priority Data

Mar. 22, 2022 (JP) ................................ 2022-046033

(51) Int. Cl.
*B41J 2/045* (2006.01)
*B41J 29/393* (2006.01)

(52) U.S. Cl.
CPC ......... *B41J 2/04541* (2013.01); *B41J 29/393* (2013.01)

(58) Field of Classification Search
CPC .... B41J 2/04541; B41J 29/393; B41J 2/0451; B41J 2/04543; B41J 2/0455; B41J 2/0458; B41J 2/04588
See application file for complete search history.

(56) References Cited

U.S. PATENT DOCUMENTS 7,878,611 B2 2/2011 Nakayama
2007/0085868 A1* 4/2007 Nakayama ........... B41J 2/04581 347/11

FOREIGN PATENT DOCUMENTS

JP 4788280 B2 10/2011

* cited by examiner

*Primary Examiner* — Bradley W Thies
(74) *Attorney, Agent, or Firm* — Venable LLP

(57) ABSTRACT

A printing element board includes a plurality of memory modules each including a memory element and a driving circuit, a plurality of discharge modules, a control data supply unit configured to select one of a memory module and a discharge module from the plurality of memory modules and the plurality of discharge modules and perform drive control, and a logical product calculation unit configured to, when the memory module is selected, receive a first signal and a second signal output at the same timing, and supply a signal indicating a logical product of the first and second signals to the control data supply unit. When the signal indicating the logical product of the first and second signals is not supplied from the calculation unit, the supply unit does not perform drive control of the memory module.

9 Claims, 9 Drawing Sheets

PRINTING ELEMENT BOARD AND PRINTING APPARATUS INCLUDING PRINTING ELEMENT BOARD

BACKGROUND OF THE INVENTION

Field of the Invention

The present invention relates to a printing element board and a printing apparatus including the printing element board.

Description of the Related Art

In general, a printing element board mounted in a liquid discharge head includes a One Time Programmable (OTP) ROM to record unique information such as product information and setting information. As an example of the OTPROM, there is an OTPROM using an anti-fuse element.

When recording information in the anti-fuse element on the printing element board or reading out information from the anti-fuse element, signals are input from the outside to a logic circuit including a driving element connected in series with the anti-fuse element to select and control the driving element. The signals input from the outside include, for example, a CLK signal, a DATA signal, a LT signal (latch signal), and the like. The DATA signal is input to a shift register in a serial format in synchronism with the edge of the CLK signal, and the shift register temporarily stores the input data corresponding to each driving element. Then, if the LT signal in low level is input to a latch circuit, the data stored in the shift register is taken in the latch circuit. If the LT signal changes to high level, the data taken in the latch circuit is held. By repeating data transfer and driving of the anti-fuse driving elements as described above, information recording and information reading out with respect to the anti-fuse elements are performed. These control signals for the driving element are similarly used in heater control on a printing element board in a thermal inkjet printing apparatus.

On the other hand, the inkjet printing apparatus is demanded to improve performance by increasing the speed or the like. As a method of increasing the printing speed, there is a method of shortening a period of discharging ink from nozzles. However, shortening the period leads to transmitting many signals at a high frequency, and the influence of electromagnetic waves radiated therefrom becomes a problem.

Further, in the thermal inkjet printing apparatus, in addition to the control signals described above, a large current flowing when driving a heater or when recording in an anti-fuse element flows from the printing apparatus main body to the printhead through a long flexible cable or the like. Therefore, noise generated due to this current interferes with other signals, and this may lead to a malfunction of the printhead. To prevent this, it is essential to ensure immunity to noise induced by the current.

Japanese Patent No. 4788280 describes that a circuit for verifying data input to a driving unit mounted in a printhead within the driving unit is held, and the circuit detects a malfunction caused by a data transfer error. More specifically, print data is input to a calculation unit 80B with a delay of the number of clocks corresponding to the number of registers (the number of stored bits) of the shift register train of a data transfer input unit 68 after the print data is input to a calculation unit 80A. A comparison unit 82 compares the parity data for the print data from the first bit to the 256th bit output from a 1-bit register 84 of the calculation unit 80A with the parity data for the print data from the first bit to the 256th bit output from the T-FF of the calculation unit 80B. If the two parity data match, it is determined that a malfunction of a head driving unit 60 has not occurred, and the printing operation is continued. On the other hand, if the two parity data do not match, it is determined that a malfunction of the head driving unit 60 has occurred due to the influence of power supply noise described above or the like, and predetermined processing is executed.

However, the technique described in Japanese Patent No. 4788280 described above has a problem that, since the parity data is used to verify the data input to the driving unit mounted in the printhead, disturbance noise on the signal before being input to the printhead causes disturbance of the input signal, and this may cause a malfunction of the printhead.

SUMMARY OF THE INVENTION

The present invention provides a technique that eliminates an influence of disturbance noise or the like on a signal input to a printing element board to drive a memory element, thereby preventing a malfunction in driving of the memory element.

According to an aspect of the present invention, there is provided a printing element board comprising a plurality of memory modules each including a memory element and a driving circuit configured to drive the memory element, a plurality of discharge modules, a control data supply unit configured to select one of a memory module and a discharge module from the plurality of memory modules and the plurality of discharge modules and perform drive control of the selected module, and a logical product calculation unit configured to, when the memory module is selected, receive a first signal and a second signal output at the same timing, and supply a signal indicating a logical product of the first signal and the second signal to the control data supply unit, wherein when the signal indicating the logical product of the first signal and the second signal is not supplied from the logical product calculation unit, the control data supply unit does not perform drive control of the memory module.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Figure 1:
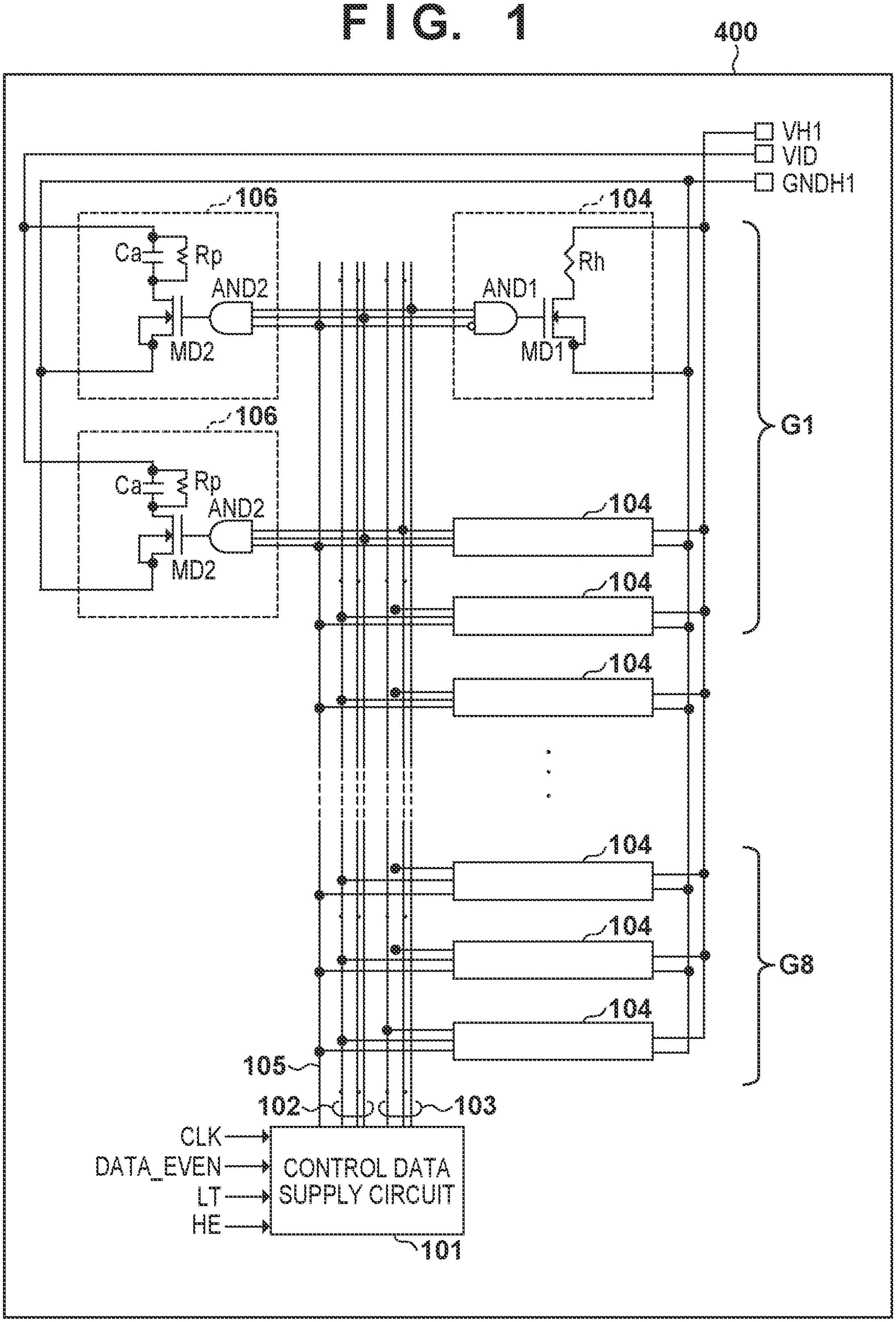
FIG. 1 is a view showing the circuit configuration of a printing element board according to the first embodiment, and showing an array of discharge modules corresponding to discharge ports in an even-numbered line formed on the printing element board.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that as an example of the present invention, a thermal type printing element board will be described. However, the present invention is not limited to this, and can also be applied to a piezoelectric type printing element board.

First Embodiment

The first embodiment of the present invention will be described with reference to FIGS. 1, 2, and 9.

Figure 9:
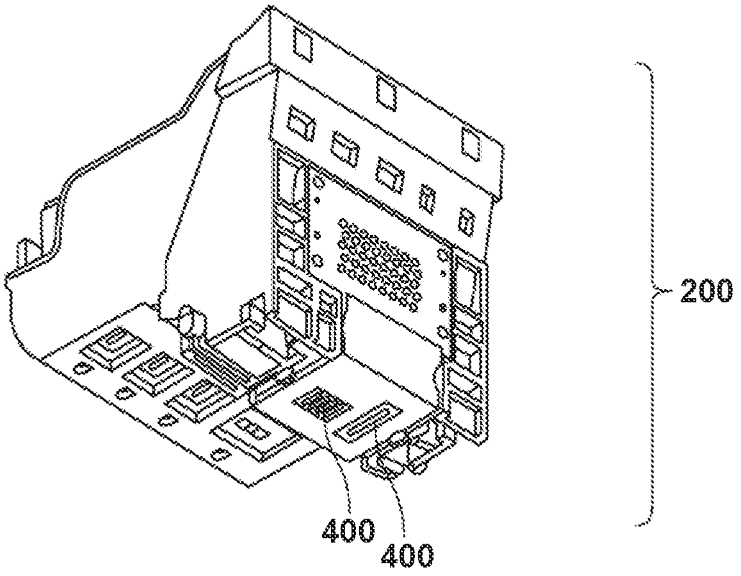
FIG. 9 is a perspective view for explaining a liquid discharge head according to the embodiment of the present invention.

FIG. 9 is a perspective view for explaining a liquid discharge head (printhead) 200 according to the embodiment of the present invention.

The liquid discharge head 200 is provided with two printing element boards 400 that discharge a liquid. The printing element board 400 includes a heater (not shown) configured to heat ink. The heater is heated, thereby generating bubbles in ink and discharging the liquid from discharge ports (nozzles) (not shown). Note that the discharge ports are divided into even-numbered lines and odd-numbered lines. Control system circuits and power supply system circuits also exist separately.

Next, circuits formed on the printing element board according to the first embodiment will be described with reference to FIGS. 1 and 2.

Figure 2:
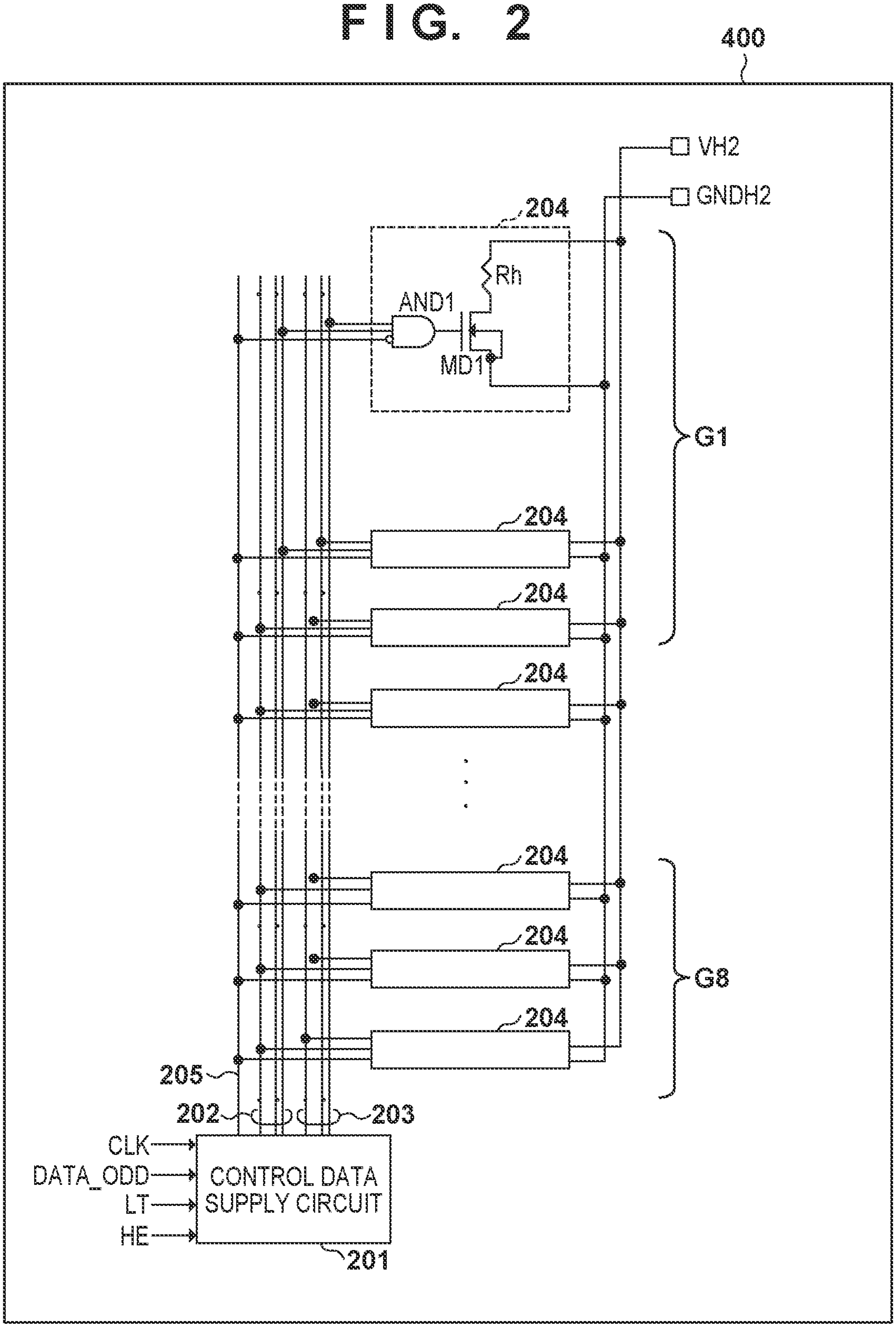
FIG. 2 is a view showing the circuit configuration of the printing element board according to the first embodiment, and showing an array of discharge modules corresponding to discharge ports in an odd-numbered line formed on the printing element board.

FIGS. 1 and 2 are views showing the circuit configuration of the printing element board 400 according to the first embodiment. Here, FIG. 1 shows an array of discharge modules 104 corresponding to discharge ports (not shown) in an even-numbered line formed on the printing element board 400, and FIG. 2 shows an array of discharge modules 204 corresponding to discharge ports in an odd-numbered line formed on the printing element board 400.

In FIG. 1, the printing element board 400 includes two memory modules 106, discharge module groups each including multiple discharge modules 104 corresponding to the discharge ports in the even-numbered line, and a control data supply circuit 101.

The discharge module 104 includes a pressure generation element (electrothermal transducer) Rh that generates energy to discharge the liquid from the discharge port (not shown) in the even-numbered line formed on the printing element board, and a driving element MD1 and a logic circuit AND1 configured to drive the pressure generation element Rh. In the first embodiment, the driving element MD1 is a MOS transistor. Here, the MOS transistor has the role of a switch that decides whether to apply a voltage to the pressure generation element Rh. The logic circuit AND1 is an AND circuit configured to drive the driving element MD1 based on a signal from the control data supply circuit 101, and performs logical calculation of a plurality of signals. When the driving element MD1 is driven to energize the pressure generation element Rh and generate heat, bubbles are generated in ink, and the ink is discharged from the discharge port, thereby performing printing. A power supply voltage VH1 (for example, 24 V) is supplied as a power supply voltage to the pressure generation element Rh. On the other hand, a ground potential GNDH is supplied to the source side of the MOS transistor MD1.

The memory module 106 includes an anti-fuse element (memory element) Ca, a parallel resistor Rp (resistor) connected in parallel with the anti-fuse element Ca, and a driving circuit including a driving element MD2 and a logic circuit AND2 configured to write information to the anti-fuse element Ca. The anti-fuse element Ca stationarily holds information when an overvoltage is supplied to it. That is, the anti-fuse element Ca functions as a One Time Programmable (OTP) ROM as a memory that can be programmed only once. Before the overvoltage is supplied, the anti-fuse element Ca is in an insulated state. When the overvoltage is supplied, the anti-fuse element Ca changes to a resistor element (resistor) and is set in an energized state. Hence, the memory function can be exhibited by, for example, determining the insulated state of the anti-fuse element Ca as "0" and the energized state as "1". The parallel resistor Rp prevents information from being erroneously written to the anti-fuse element Ca as the overvoltage from a power supply voltage VID is applied to both ends of the anti-fuse element Ca although the driving element MD2 is in a nonconductive state. The driving element MD2 is, for example, a transistor. When recording information "1" in the anti-fuse element Ca, the driving element MD2 is driven to apply a voltage to the anti-fuse element Ca, and the anti-fuse element Ca is set in the energized state by the applied voltage, thereby storing the information "1". The power supply voltage VID (for example, 24V) is supplied to the anti-fuse element Ca, and the ground potential GNDH is supplied to the source side of the MOS transistor MD2.

Note that although the power supply voltage VID and the power supply voltage VH1 use independent power supply lines, if the minimum value of the voltage needed for write to the anti-fuse element is equal to or less than the power supply voltage VH1, the power supply voltage VH1 may be used as the power supply voltage VID together with, for example, a step-down circuit.

The control data supply circuit 101 is a circuit configured to drive the driving elements MD1 and MD2, and includes, for example, a shift register (not shown) and a latch circuit (not shown). A clock signal (CLK), a data signal (DATA), a latch signal (LT), and a heat enable signal (HE) are input from the outside of the printing element board to the control data supply circuit 101 via terminals of the printing element board. The data signal (DATA) includes information for selecting the discharge module 104 and the memory module 106. The data signal (DATA) is input in a serial format in synchronism with the clock signal (CLK).

The control data supply circuit 101 receives the data signal (DATA) and generates a block selection signal, a group selection signal, and a switching signal based on the information included in the data signal (DATA). Based on these signals, the discharge module 104 in the even-numbered line and the memory module 106 are selected and driven. The control data supply circuit 101 supplies, to the logic circuits (AND1 and AND2), the block selection signal via a signal line 102, the group selection signal via a signal line 103, and the switching signal via a signal line 105.

To time-divisionally drive the discharge module 104 and the memory module 106, as shown in FIG. 1, the multiple discharge modules 104 are divided into eight groups (G1, . . . , G8) each including three discharge modules 104. In addition, three blocks (1, 2, 3) are assigned to the discharge modules 104 of each group. This makes it possible to time-divisionally select and drive the discharge module 104 and the memory module 106. Also, at the time of readout of the anti-fuse element (to be described later), it is possible to time-divisionally access the memory module 106.

Here, the group selection signal is a signal used to select which group is to be driven when the multiple discharge modules 104 are divided into a plurality of groups. The block selection signal is a signal used to select which pressure generation element Rh of a plurality of pressure generation elements Rh in the same group is to be driven. As the driving element MD1, a DMOS transistor (Double-diffused MOSFET) that is a MOS transistor and can resist a high voltage is used. Here, in the embodiment, as an example, the multiple discharge modules 104 are divided into eight groups (G1, . . . , G8) each including three discharge modules. However, the present invention is not limited to this, and the multiple discharge modules 104 may be divided into eight groups each including 16 discharge modules 104.

As has been described above, the control data supply circuit 101 can select and drive the anti-fuse element Ca by using the signal line 102 and the signal line 103. At this time, the switching signal line 105 is used. Based on the switching signal from the switching signal line 105, a case where the anti-fuse element Ca is driven and a case where the discharge module 104 is driven are switched. Hence, the block selection signal, the group selection signal, and the switching signal 105 are input to the logic circuit AND2 of the memory module 106. A signal according to the input signals is output from the logic circuit AND2 to the driving element MD2 of the memory module 106 to drive the anti-fuse element Ca, and the anti-fuse element Ca is changed from the insulated state to the energized state. As the driving element MD2 of the memory module 106, a DMOS transistor is used, like the driving element MD1 of the discharge module 104. The logic circuit AND2 of the memory module 106 is formed by a MOS transistor. In the example shown in FIG. 1, the memory module 106 is selected if the switching signal 105 is at high level, and the discharge module 104 is selected if the switching signal 105 is at low level.

FIG. 2 is an electric circuit diagram formed with discharge module groups each including multiple discharge modules 204 corresponding to the discharge ports (not shown) in the odd-numbered line formed on the printing element board 400. This printing element board includes the multiple discharge modules 204 and a control data supply circuit 201. The circuit configurations and operations of the discharge module 204 and the control data supply circuit 201 are similar to those of the discharge module 104 and the control data supply circuit 101 shown in FIG. 1, and a description thereof will be omitted.

Figure 3:
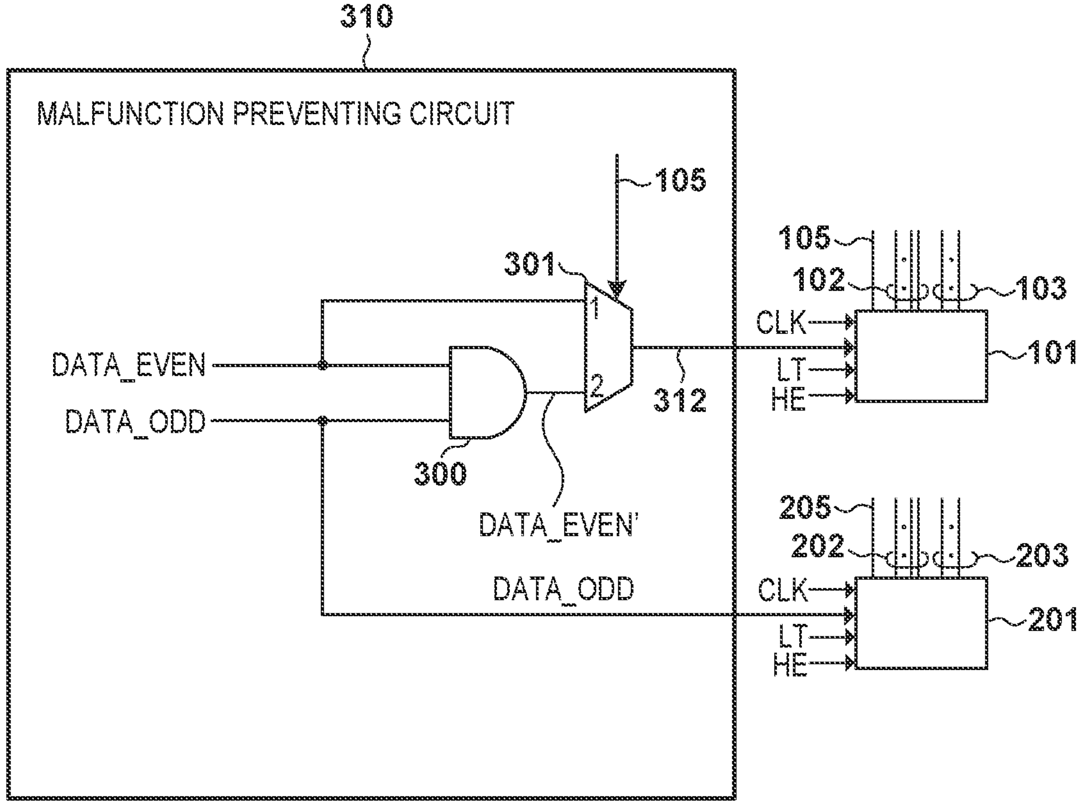
FIG. 3 is a circuit diagram showing an example of a malfunction preventing circuit for an anti-fuse element formed on the printing element board according to the first embodiment.

FIG. 3 is a circuit diagram showing an example of a malfunction preventing circuit 310 for the anti-fuse element formed on the printing element board 400 according to the first embodiment.

The malfunction preventing circuit 310 includes a logical product circuit (AND) 300 and a selector 301 configured to control the control data supply circuit 101 for controlling the discharge modules 104 corresponding to the discharge ports in the even-numbered line shown in FIG. 1 and the control data supply circuit 201 for controlling the discharge modules 204 corresponding to the discharge ports in the odd-numbered line shown in FIG. 2. An even-numbered line control data signal (DATA_EVEN (first signal)) and an odd-numbered line control data signal (DATA_ODD (second signal)) are input to the logical product circuit 300. The logical product circuit 300 performs logical product calculation of these two input signals, and generates an even-numbered line composite data signal (DATA_EVEN') as an output. When driving the anti-fuse element, the signal DATA_EVEN' input to the terminal (2) of the selector 301 is selected and input to the control data supply circuit 101 as an output signal 312 to control the memory module 106 shown in FIG. 1.

Figure 5:
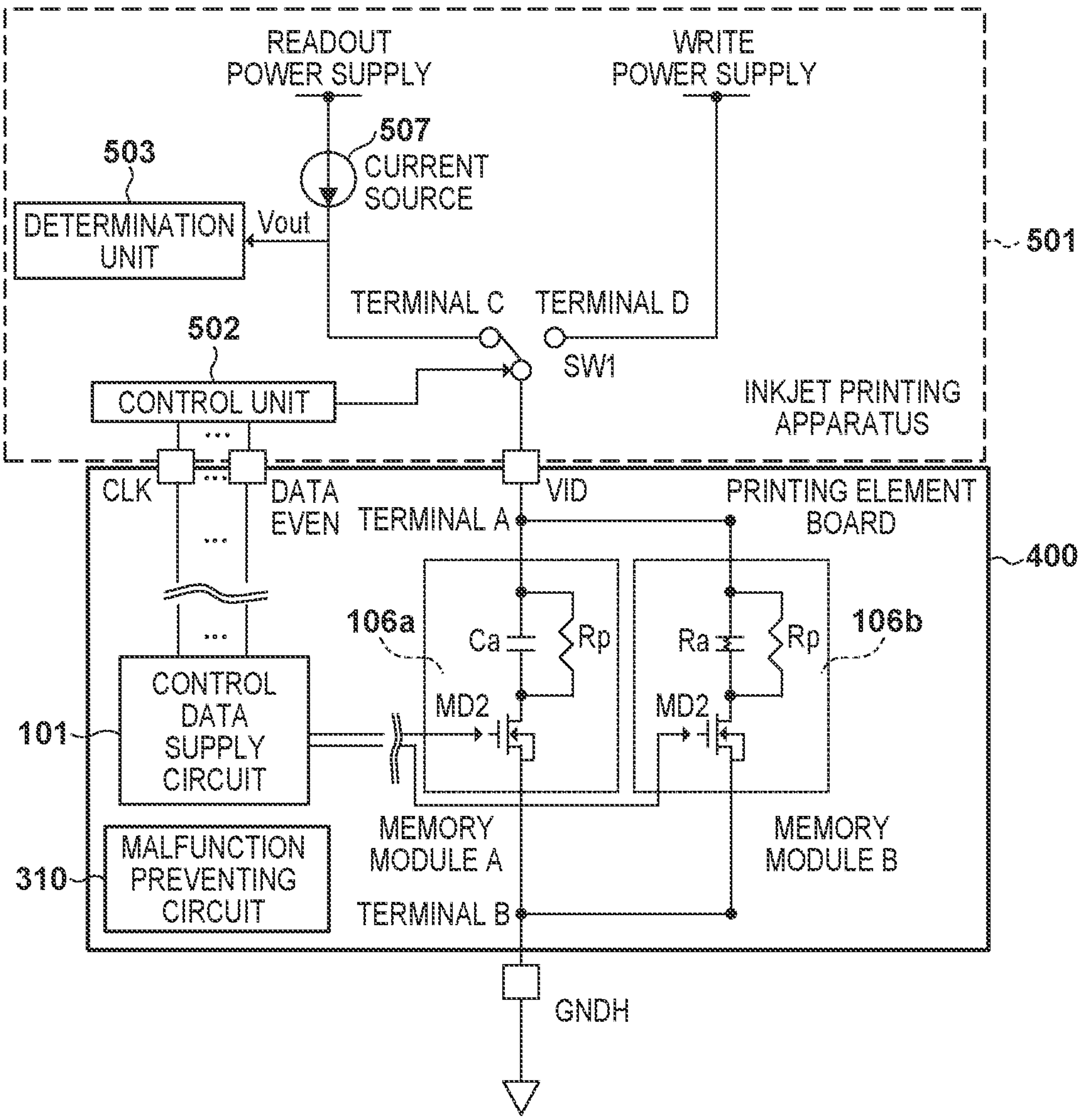
FIG. 5 is a view for explaining connections between the circuit configuration of the printing element board and an inkjet printing apparatus according to the first embodiment.

The selector 301 selects one of the even-numbered line control data signal (DATA_EVEN) and the even-numbered line composite data signal (DATA_EVEN') in accordance with the switching signal 105, and outputs the selected signal as the output signal 312. When controlling the discharge module 104 shown in FIG. 1, the even-numbered line control data signal (DATA_EVEN) need be input intact to the control data supply circuit 101. Hence, the switching signal 105 is set at low level. With this, the even-numbered line control data signal (DATA_EVEN) input to the terminal (1) of the selector 301 is selected and output as the output signal 312. On the other hand, when driving the anti-fuse element, the switching signal 105 is set at high level, and the even-numbered line composite data signal (DATA_EVEN'), which is generated by logical product calculation and output by the logical product circuit 300 and input to the terminal (2) of the selector 301, is selected and output as the output signal 312. Note that the switching signal 105 is output, for example, from a control unit 502 of a printing apparatus (FIG. 5). Note that the control data supply circuit 201 for controlling the discharge modules 204 corresponding to the discharge ports in the odd-numbered line is controlled by an odd-numbered line control data signal (DATA_ODD).

Figure 4A:
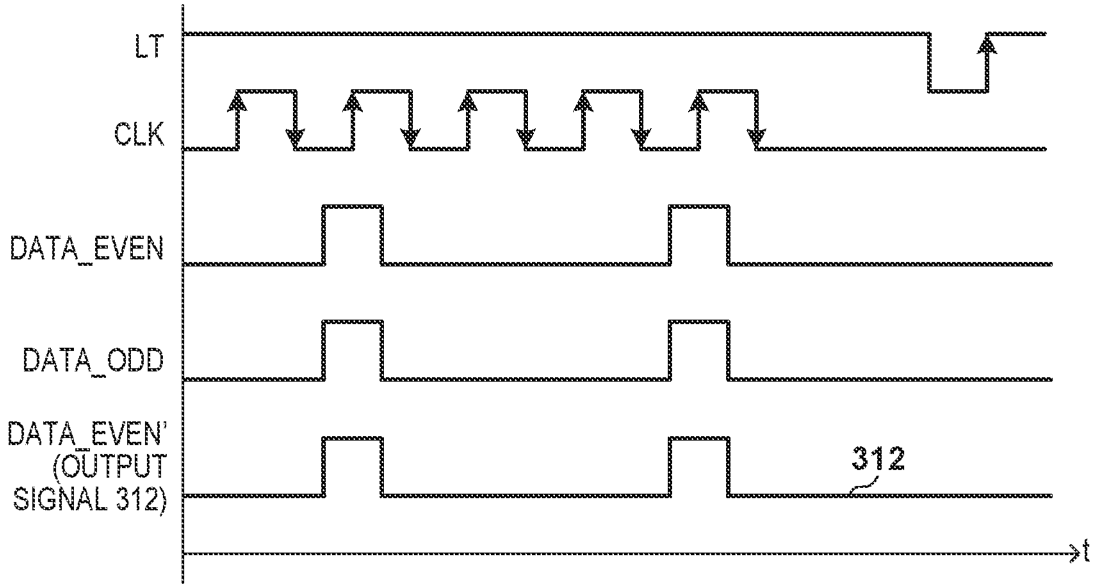
FIGS. 4A and 4B are views each showing an example of the waveforms of input and output signals in the malfunction preventing circuit at the time of driving one anti-fuse element in the first embodiment.
Figure 4B:
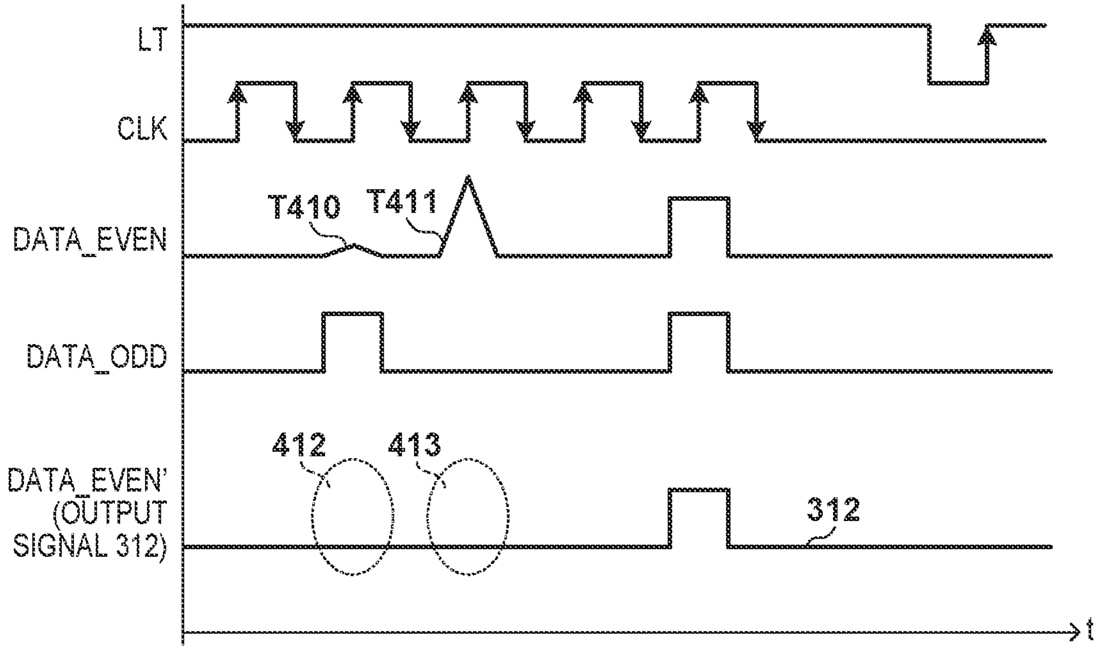

FIGS. 4A and 4B are views each showing an example of the waveforms of input and output signals in the malfunction preventing circuit 310 at the time of driving one anti-fuse element in the first embodiment. The input signals include the even-numbered line control data signal (DATA_EVEN), the odd-numbered line control data signal (DATA_ODD), and the switching signal 105. Note that the switching signal 105 is set at high level here to drive the anti-fuse element, but illustration thereof is omitted in FIGS. 4A and 4B.

FIG. 4A shows a case in which the input signals DATA_EVEN and DATA_ODD, which are originally pulse signals inverted at the same timing, are inverted at the same timing without being influenced by disturbance noise and the like. In this case, the input signals (DATA_EVEN and DATA_ODD) are identical signals, so that the output signal (DATA_EVEN') after passing through the logical product circuit 300 has the same waveform as the input signals. Then, the output signal (DATA_EVEN') is selected by the selector 301 and output as the output signal 312. Based on the output signal (DATA_EVEN'), the target memory module 106 is selected, and one of the anti-fuse elements is driven.

FIG. 4B shows a case in which the two input signals (DATA_EVEN and DATA_ODD) are different from each other. The logical product calculation AND produces low level only in a portion where the logics of the two signals input to the logical product circuit 300 at the same timing are different from each other. For example, if the signal DATA_EVEN becomes low level due to the influence of an external disturbance at a timing T410, a corresponding output waveform 412 also becomes low level. In addition, if the signal DATA_EVEN alone becomes high level due to the influence of an external disturbance at a timing T411, a corresponding output waveform 413 becomes low level. Then, the output signal (DATA_EVEN') is selected by the selector 301 and output as the output signal 312. Accordingly, at the timings T410 and T411, the memory module 106 is not selected so the anti-fuse element is not driven.

In this manner, the malfunction preventing circuit 310 according to the first embodiment outputs the intended signal only if two input signals match. Accordingly, it is possible to obtain an effect of preventing a malfunction in driving of the anti-fuse element caused by disturbance noise on the input signal or the like.

FIG. 5 is a view for explaining connections between the circuit configuration of the printing element board 400 and an inkjet printing apparatus 501 according to the first embodiment. The printing element board 400 includes a plurality of memory modules.

The inkjet printing apparatus 501 includes the control unit 502 and a determination unit 503. The control unit 502 controls the operation of the printing element board 400. The determination unit 503 discriminates whether the anti-fuse element Ca of the memory module is in an insulated state or not. Also, based on the result of discrimination by the determination unit 503, the control unit 502 determines the information stored in the memory module, and controls the inkjet printing apparatus 501 based on the information.

Also, the control unit 502 performs switching control of a switch (SW1). If the switch SW1 is connected to a terminal C, the path between a readout power supply (for example, 5 V) and a terminal A of the anti-fuse element Ca is established. On the other hand, if the switch SW1 is connected to a terminal D, the path between a write power supply (for example, 24 V) and the terminal A of the anti-fuse element Ca is established.

Furthermore, the control unit 502 generates control data to be transmitted, via the CLK terminal and the DATA terminal of the printing element board 400, to the control data supply circuit 101 of the printing element board 400. The control data includes the clock signal (CLK), the data signal (DATA), the latch signal (LT), and the heat enable signal (HE). By the control data, selection and drive control of the driving element MD2 of the memory module 106 is performed.

The write power supply mounted in the inkjet printing apparatus 501 is connected to the terminal A of the printing element board 400, and the terminal B of the printing element board 400 is connected to ground mounted in the inkjet printing apparatus 501. To write information to the anti-fuse element Ca, the switch SW1 is connected to the terminal D to set the driving element MD2 of the memory module in an ON state. Thus, the high voltage VID is applied to a gate oxide film that forms the anti-fuse element Ca. The gate oxide film is thus broken, the anti-fuse element Ca is electrically set in a conductive state, and information is written. The anti-fuse element Ca that is a capacitive element before the write changes to a resistor element Ra after the write. Of the two memory modules 106 shown in FIG. 5, a memory module A shows a state in which information is not written to the anti-fuse element Ca (a state in which dielectric breakdown has not occurred). A memory module B shows a state in which information is written to the anti-fuse element, and the anti-fuse element changes to the resistor element Ra (a state in which dielectric breakdown has occurred).

An operation when reading out information recorded in the anti-fuse element will be described next with reference to FIG. 5. Note that the discharge modules 104 and 204, and the like shown in FIGS. 1 and 2 are not illustrated in FIG. 5 for the descriptive convenience. Since the switch SW1 is connected to the terminal C, the terminal A is connected to a current source 507 mounted in the inkjet printing apparatus 501, and the terminal B is connected to ground. In the first embodiment, when a constant current is supplied from the current source 507 to the terminal A, a voltage Vout generated in the terminal A is read by the inkjet printing apparatus 501, thereby determining the write state of the anti-fuse element. That is, it is determined whether the stored information is "1" or "0".

As has been described above, according to the first embodiment, when driving the anti-fuse element, even if noises enter, at different timings, two input signals to be input to the printing element board, the influence of an external disturbance caused by the noise is removed, and an effect of preventing a malfunction in driving of the anti-fuse element can be obtained.

Second Embodiment

The second embodiment will be described using FIGS. 6, 7A, and 7B.

Figure 6:
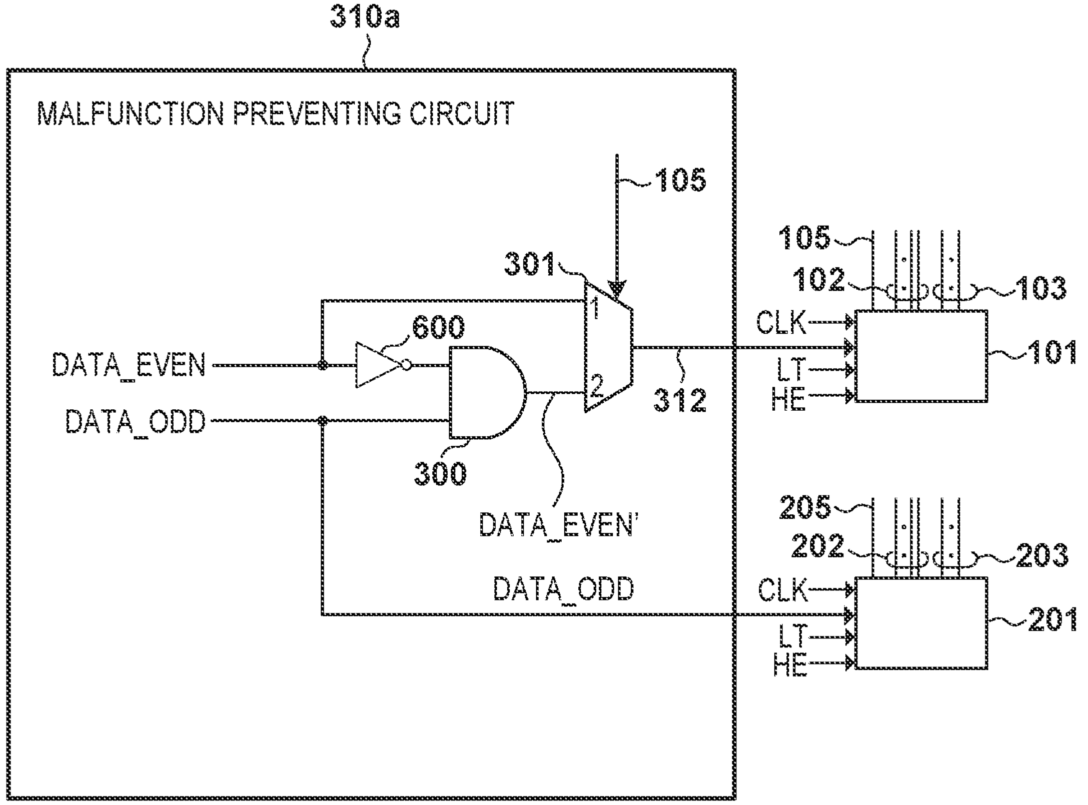
FIG. 6 is a view showing an example of a malfunction preventing circuit for an anti-fuse element formed on a printing element board according to the second embodiment of the present invention.

FIG. 6 is a view showing an example of a malfunction preventing circuit 310*a* for an anti-fuse element formed on a printing element board 400 according to the second embodiment of the present invention. Note that the same reference numerals as in FIG. 3 described above denote the same parts in FIG. 6, and a description thereof will be omitted.

In addition to the logical product circuit (AND) 300 and the selector 301 configured to control the control data supply circuit 101 and the control data supply circuit 201 shown in FIG. 3 in the first embodiment, the malfunction preventing circuit 310*a* includes an inverter circuit 600.

In the second embodiment, an even-numbered line control data signal (DATA_EVEN) is input to the inverter circuit 600, logically inverted, and output. This output signal and an odd-numbered line control data signal (DATA_ODD) are input to the logical product circuit 300 to generate an even-numbered line composite data signal (DATA_EVEN'). When driving the memory module, the signal DATA_EVEN' passes through the selector 301 and is input to a control data supply circuit 101 for even-numbered line control to control the memory module 106 shown in FIG. 1. A control data supply circuit 201 for controlling discharge modules 204 corresponding to discharge ports in the odd-numbered line is controlled by the odd-numbered line control data signal (DATA_ODD) as in the first embodiment.

Figure 7A:
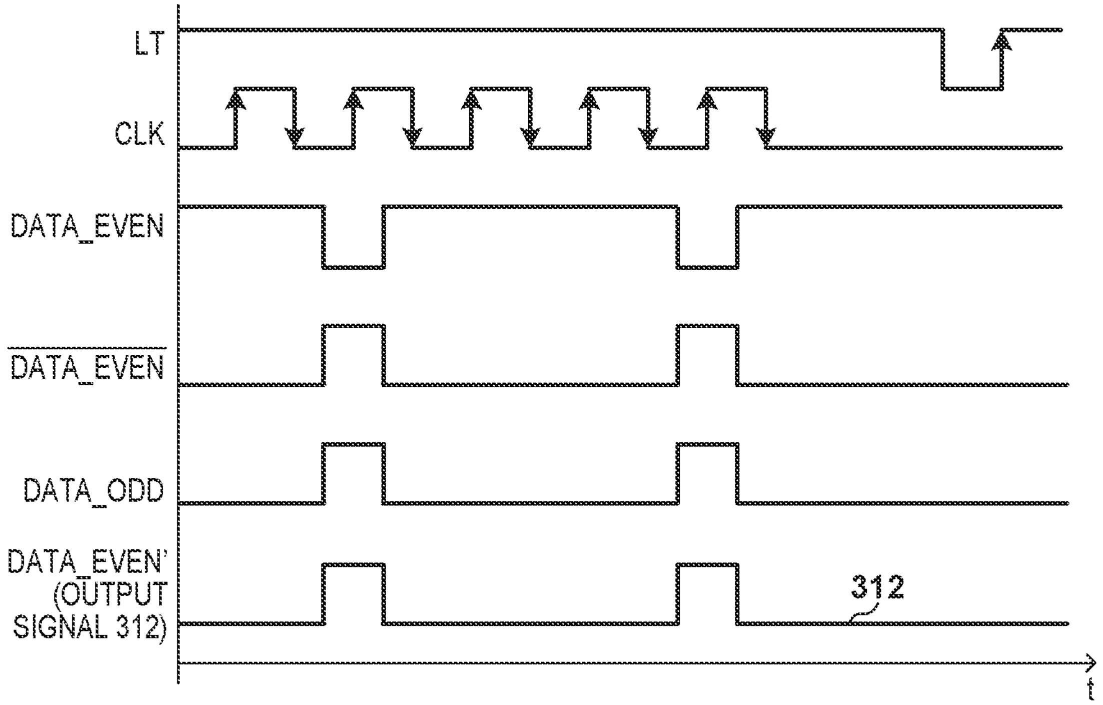
FIGS. 7A and 7B are views each showing an example of the waveforms of input and output signals in a malfunction preventing circuit at the time of driving one anti-fuse element in the second embodiment.
Figure 7B:
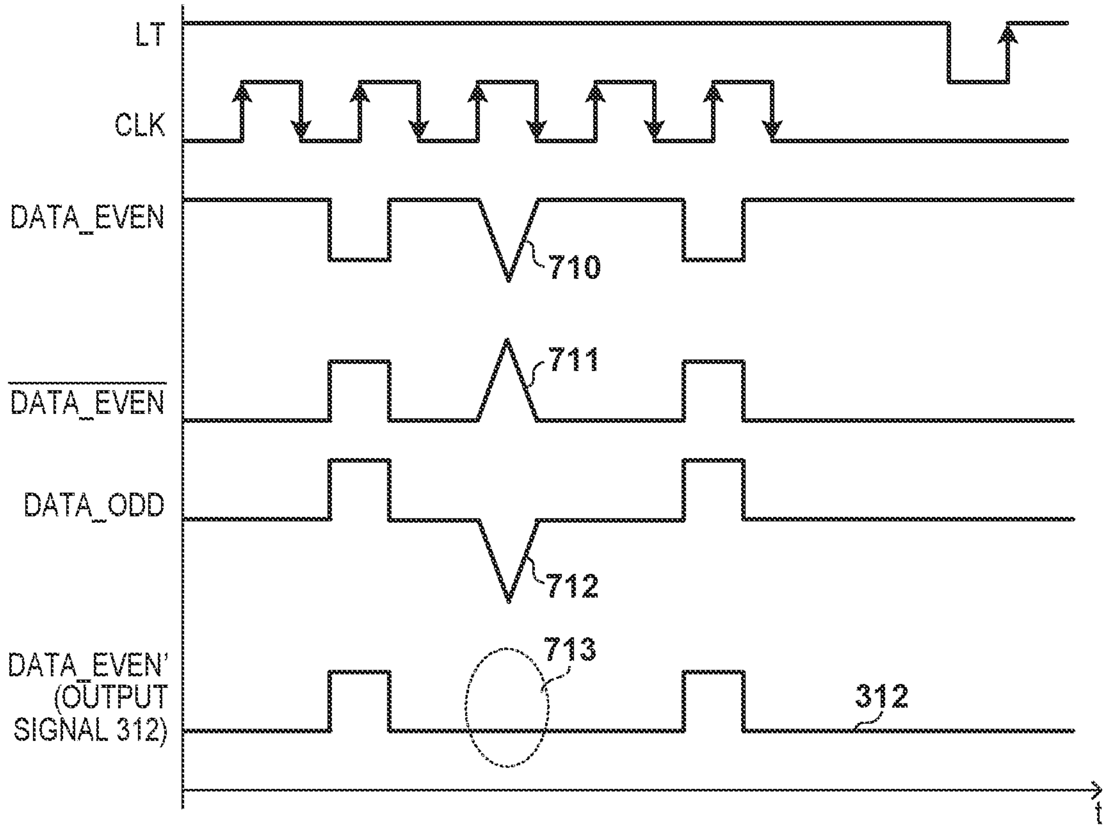

FIGS. 7A and 7B are views each showing an example of the waveforms of input and output signals in the malfunction preventing circuit 310*a* at the time of driving one anti-fuse element in the second embodiment. The input signals include the even-numbered line control data signal (DATA_EVEN), the odd-numbered line control data signal (DATA_ODD), and a switching signal 105. Note that the switching signal 105 is set at high level here to drive the anti-fuse element, but an illustration thereof is omitted in FIGS. 7A and 7B. In the second embodiment, at the time of input to the printing element board 400, the logic of the signal DATA_EVEN has been inverted in advance with respect to the signal DATA_ODD.

FIG. 7A shows a case in which the logically inverted signal of the signal DATA_EVEN and the signal DATA_ODD are inverted at the same timing. In this case, the waveform of the logically inverted signal of the signal DATA_EVEN, the waveform of the signal DATA_ODD, and the waveform of the signal DATA_EVEN' as the output signal are the same. Based on the signal DATA_EVEN', the target memory module 106 for the even-numbered line is selected, and one anti-fuse element is driven.

FIG. 7B shows an example of the waveforms in a case in which noises enter the two input signals DATA_EVEN and DATA_ODD at the same timing. The timing and size of a noise 710 of the signal DATA_EVEN and the timing and size of a noise 712 of the signal DATA_ODD are the same. The signal DATA_EVEN is inverted by the inverter circuit 600, and the noise is also inverted as denoted by reference numeral 711. Further, by passing through the logical product circuit AND 300, logical product calculation with the signal DATA_ODD is performed. As a result, two noises 711 and 712 are canceled as denoted by reference numeral 713. Accordingly, an output signal 312 (DATA_EVEN') in this case has a waveform obtained by removing the noise 710 and the noise 712 from the waveforms of the input signals.

As has been described above, according to the second embodiment, when driving the anti-fuse element, even if noises enter, at the same timing, two input signals to be input to the printing element board, the influence of an external disturbances caused by the noise is removed, and an effect of preventing a malfunction in driving of the anti-fuse element can be obtained.

Third Embodiment

Figure 8:
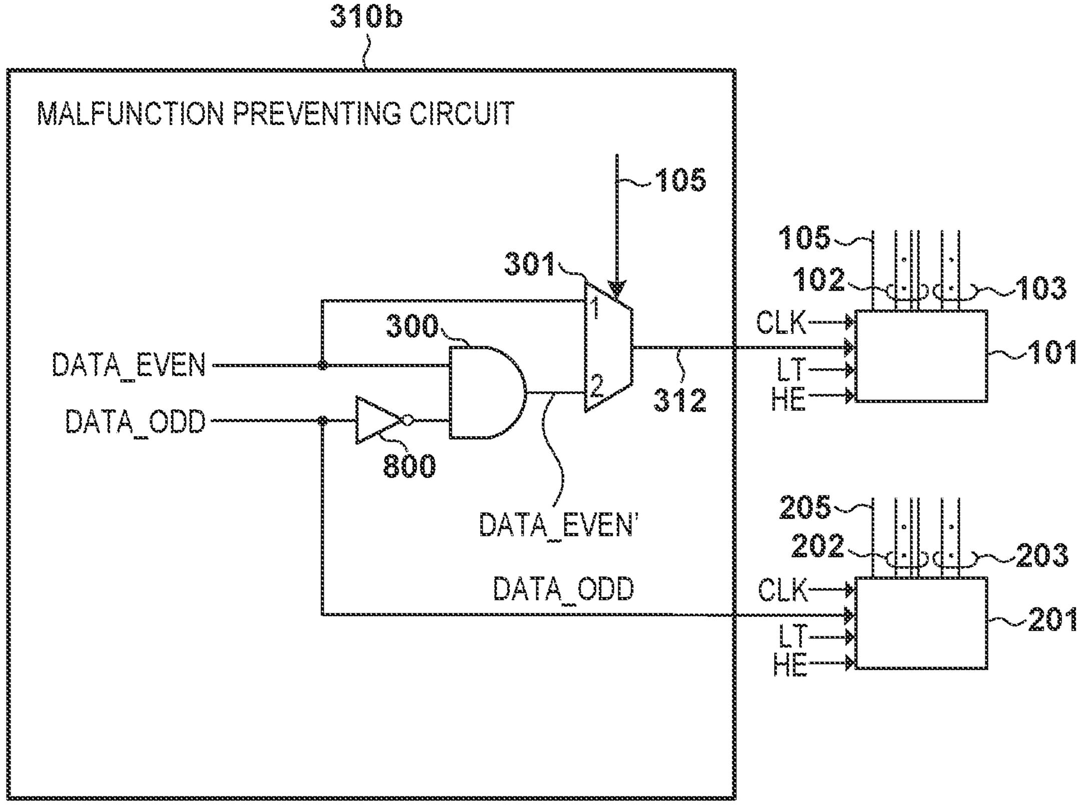
FIG. 8 is a view showing an example of a malfunction preventing circuit for an anti-fuse element formed on a printing element board according to the third embodiment of the present invention.

FIG. 8 is a view showing an example of a malfunction preventing circuit 310*b* for an anti-fuse element formed on a printing element board 400 according to the third embodiment of the present invention. Note that the same reference numerals as in FIG. 3 described above denote the same parts in FIG. 8, and a description thereof will be omitted.

In the malfunction preventing circuit 310*b*, an inverter circuit 800 is connected to a signal line for a signal DATA_ODD. The operation principle and output result in this case are similar to those in the above-described second embodiment, and a description thereof will be omitted.

As has been described above, according to the third embodiment, when driving the anti-fuse element, even if noises of the same size enter, at the same timing, two input signals to be input to the printing element board, which are originally inverted at the same timing, the influence of the noises is removed, and an effect of preventing a malfunction in driving of the anti-fuse element can be obtained.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-046033, filed Mar. 22, 2022, which is hereby incorporated by reference herein in its entirety.

What is claimed is:

1. A printing element board comprising:

a plurality of memory modules each including a memory element and a driving circuit configured to drive the memory element, a plurality of discharge modules, a control data supply unit configured to select one of a memory module and a discharge module from the plurality of memory modules and the plurality of discharge modules and perform drive control of the selected module, and a logical product calculation unit configured to, when the memory module is selected, receive a first signal and a second signal output at the same timing, and supply a signal indicating a logical product of the first signal and the second signal to the control data supply unit, wherein when the signal indicating the logical product of the first signal and the second signal is not supplied from the logical product calculation unit, the control data supply unit does not perform drive control of the memory module.

2. The board according to claim 1, wherein the first signal and the second signal are pulse signals that are inverted at the same timing.

3. The board according to claim 1, further comprising:
a selection unit configured to receive an output of the logical product calculation unit and one of the first signal and the second signal and, when the memory module is selected, select and supply the output of the logical product calculation unit to the control data supply unit.

4. The board according to claim 3, wherein
when the discharge module is selected, the selection unit selects and supplies one of the first signal and the second signal to the control data supply unit.

5. The board according to claim 1, further comprising:
an inversion unit configured to invert the first signal,
wherein the logical product calculation unit receives the first signal inverted by the inversion unit and the second signal, and outputs a signal indicating the logical product.

6. The board according to claim 1, further comprising:
an inversion unit configured to invert the second signal,
wherein the logical product calculation unit receives the second signal inverted by the inversion unit and the first signal, and outputs a signal indicating the logical product.

7. The board according to claim 1, wherein
the memory element is an anti-fuse element.

8. The board according to claim 1, wherein
a printhead includes a plurality of discharge ports,
the plurality of discharge ports are divided into an even-numbered line and an odd-numbered line, and
the plurality of discharge modules form a first discharge module group configured to drive the discharge ports in the even-numbered line and a second discharge module group configured to drive the discharge ports in the odd-numbered line, the first signal is used to select the first discharge module group, and the second signal is used to select the second discharge module group.

9. A printing apparatus comprising:
a printing element board, and
a control unit configured to drive a printhead including the printing element board to perform printing, wherein
the printing element board comprises:
a plurality of memory modules each including a memory element and a driving circuit configured to drive the memory element,
a plurality of discharge modules,
a control data supply unit configured to select one of a memory module and a discharge module from the plurality of memory modules and the plurality of discharge modules, and perform drive control of the selected module, and
a logical product calculation unit configured to, when the memory module is selected, receive a first signal and a second signal output at the same timing, and supply a signal indicating a logical product of the first signal and the second signal to the control data supply unit, and
when the signal indicating the logical product of the first signal and the second signal is not supplied from the logical product calculation unit, the control data supply unit does not perform drive control of the memory module.

* * * * *